US011687064B2

(12) United States Patent
De et al.

(10) Patent No.: US 11,687,064 B2
(45) Date of Patent: Jun. 27, 2023

(54) IBATCH INTERACTIVE BATCH OPERATIONS SYSTEM ENABLING OPERATIONAL EXCELLENCE AND COMPETENCY TRANSITION

(71) Applicant: Honeywell International Inc., Morris Plains, NJ (US)

(72) Inventors: Rahul De, Bangalore (IN); Avinash Rajan, Bangalore (IN); Kalyanasundaram Govindaraj, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1268 days.

(21) Appl. No.: 16/151,133

(22) Filed: Oct. 3, 2018

(65) Prior Publication Data
US 2019/0137982 A1 May 9, 2019

Related U.S. Application Data

(60) Provisional application No. 62/583,368, filed on Nov. 8, 2017.

(51) Int. Cl.
*G05B 19/418* (2006.01)
*G05B 17/02* (2006.01)

(52) U.S. Cl.
CPC ....... *G05B 19/41885* (2013.01); *G05B 17/02* (2013.01); *G05B 19/4183* (2013.01); *G05B 19/41845* (2013.01); *G05B 2219/32095* (2013.01)

(58) Field of Classification Search
CPC ............ G05B 19/41885; G05B 17/02; G05B 19/4183; G05B 19/41845; G05B 2219/32095; G05B 2219/31265; G05B 2219/31288; G05B 2219/32077; G05B 2219/32196; Y02P 90/02; Y02P 90/80
See application file for complete search history.

(56) References Cited

U.S. PATENT DOCUMENTS

| 2007/0279416 | A1 | 12/2007 | Cobb et al. | |
| 2008/0066019 | A1* | 3/2008 | Worek | G05B 19/4183 715/965 |

(Continued)

FOREIGN PATENT DOCUMENTS

EP 2806379 A1 11/2014

*Primary Examiner* — Christopher E. Everett
(74) *Attorney, Agent, or Firm* — Seager, Tufte & Wickhem, LLP

(57) ABSTRACT

This disclosure provides an apparatus and method for interactive batch operations system enabling operation excellence and competency transition. The method includes collecting data related to a batch process from different departments within a batch processing facility into a common data repository; transforming the collected data based on provided intelligence; exploiting the transformed data in the common data repository; determining a best possible alternative for continued operation of the batch process based on the exploited data; providing a visualization of the best possible alternative of the batch process using a digital twin; and operating the batch process using the determined best possible alternative on a physical twin corresponding to the digital twin.

19 Claims, 4 Drawing Sheets

(56) References Cited

U.S. PATENT DOCUMENTS

| | | | |
|---|---|---|---|
| 2009/0125906 A1* | 5/2009 | Moore, Jr. | G05B 19/41865 |
| | | | 718/101 |
| 2009/0149981 A1* | 6/2009 | Evans | G05B 23/0267 |
| | | | 703/2 |
| 2012/0173299 A1* | 7/2012 | McMullin | G06Q 10/063 |
| | | | 705/7.11 |
| 2014/0257901 A1 | 9/2014 | Murthy | |
| 2014/0337429 A1* | 11/2014 | Asenjo | H04L 67/10 |
| | | | 709/204 |
| 2016/0274558 A1* | 9/2016 | Strohmenger | G05B 23/0237 |
| 2018/0268342 A1 | 9/2018 | Duncan et al. | |

* cited by examiner

IBATCH INTERACTIVE BATCH OPERATIONS SYSTEM ENABLING OPERATIONAL EXCELLENCE AND COMPETENCY TRANSITION

CROSS-REFERENCE TO RELATED APPLICATION AND PRIORITY CLAIM

This application claims priority under 35 U.S.C. § 119(e) to U.S. Provisional Patent Application No. 62/583,368 filed on Nov. 8, 2017. This provisional application is hereby incorporated by reference in its entirety.

TECHNICAL FIELD

This disclosure relates generally to industrial process control and automation systems. More specifically, this disclosure relates to an apparatus and method for interactive batch operations enabling operation excellence and competency transition.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process. Model-based controllers typically depend on having accurate models of a process's behavior in order to perform well and effectively control the process. As conditions change in the process, a controller's models typically need to be updated.

SUMMARY

This disclosure provides an apparatus and method for interactive batch operations enabling operation excellence and competency transition.

In a first embodiment, a method provides for interactive batch operations enabling operation excellence and competency transition. The method includes collecting data related to a batch process from different departments within a batch processing facility into a common data repository; transforming the collected data based on provided intelligence; exploiting the transformed data in the common data repository; determining a best possible alternative for continued operation of the batch process based on the exploited data; providing a visualization of the best possible alternative of the batch process using a digital twin; and operating the batch process using the determined best possible alternative on a physical twin corresponding to the digital twin.

In a second embodiment, an apparatus provides for interactive batch operations enabling operation excellence and competency transition. The apparatus includes at least one memory and at least one processor operatively coupled to the at least one memory. The at least one processor collects data related to a batch process from different departments within a batch processing facility into a common data repository; transforms the collected data based on provided intelligence; exploits the transformed data in the common data repository; determines a best possible alternative for continued operation of the batch process based on the exploited data; provide a visualization of the best possible alternative of the batch process using a digital twin; and operates the batch process using the determined best possible alternative on a physical twin corresponding to the digital twin.

In a third embodiment, a non-transitory computer readable medium provides for interactive batch operations enabling operation excellence and competency transition. The non-transitory machine-readable medium is encoded with executable instructions that, when executed, cause one or more processors to collect data related to a batch process from different departments within a batch processing facility into a common data repository; transform the collected data based on provided intelligence; exploit the transformed data in the common data repository; determine a best possible alternative for continued operation of the batch process based on the exploited data; provide a visualization of the best possible alternative of the batch process using a digital twin; and operate the batch process using the determined best possible alternative on a physical twin corresponding to the digital twin.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
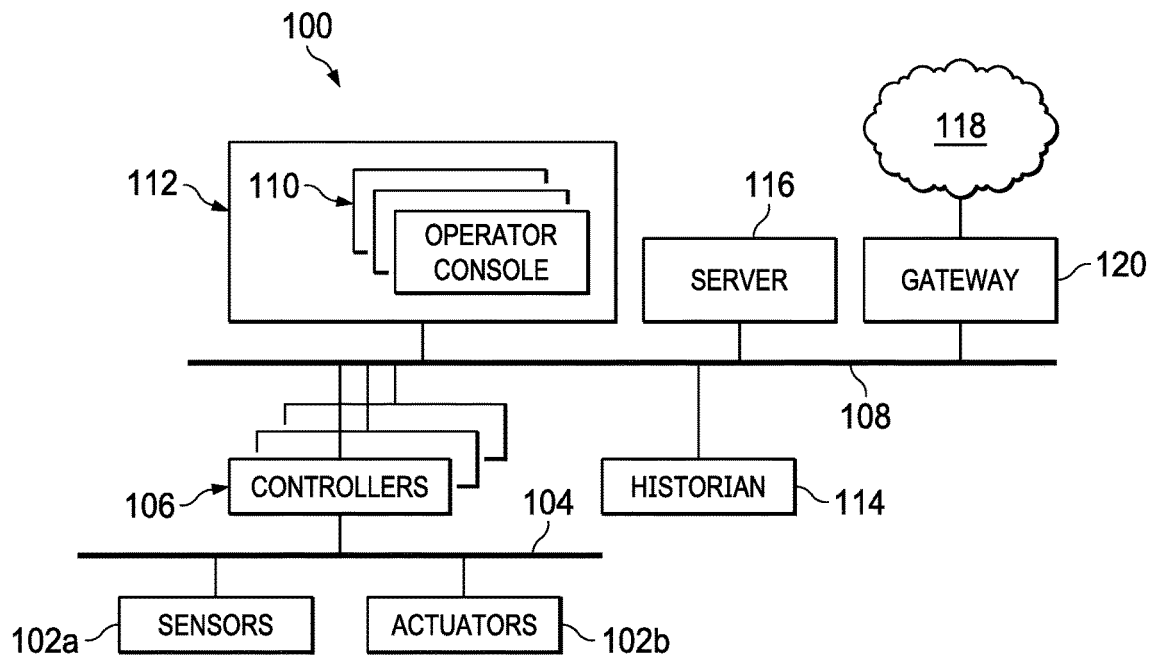
FIG. 1 illustrates an example industrial process control and automation system according to this disclosure.

FIGS. 1-5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

A batch process manufacturing plant or refinery may have several industrial departments like a procurement section, a production section, a maintenance section, a delivery or dispatch section, an enterprise resource planning (ERP) section, a quality section, etc.

A procurement section can deal with procurement of raw materials and maintain the schedule of all delivery of said raw materials. The procurement section can determine shortages of materials or regularly scheduled deliveries and refills of materials used in a batch process.

A production section can manage the operations for creating products from the raw materials. The production section executes the batch sequences over a predefined set of equipment and defined set of quantities to create a final product. Day to day operations can include identifying the products that need to be created based on the daily demand as supplied by a marketing department, and equipment selection for running the batch sequences, etc.

A maintenance section can manage the maintenance schedule of an entire plant. The maintenance schedule can include field instrumentation, equipment such as reactors, mixers, blender, etc. The maintenance schedule can also attend to breakdown situations or ordinary maintenance and replacements of the field instruments or equipment.

A delivery or dispatch section can maintain the delivery schedule of the tanker/wagons/marine as well as information related to the quantities, blending of different products, etc. The delivery or dispatch section can track the products or transportation services from the batch process manufacturing plant or refinery.

An ERP section can maintain the demand for the various products, which is passed on to the production section. For instance, the ERP section can track orders or predict orders from a customer to monitor the demand for a specific product or a group of products.

A quality section maintains the historical data for all quality checks for products manufacturing. The quality section stores data on any defects in the batch process or the produced goods.

It is this coordination across different sections, and the information flows between them, that is a struggle for process companies. Each section has a separate view of the supply chain, and usually the section's own proprietary tools, so it is imperative to unite these differing perspectives into a single comprehensive view. A unified view across all the section highlights conflicts and opportunities, and enables the conflicts and opportunities to be more quickly and easily addressed. Even with the adoption of best-in-class supply chain and production management (SCPM) applications, achieving a holistic overview of business functions remains a key challenge for many organizations.

Currently managing batch operations in a manufacturing plant also requires in-depth process knowledge and plant operations experience. Operational decisions require factoring data from multiple data sources and in-depth knowledge on batch processes of the plant before taking appropriate corrective actions.

There is too much dependence today on process experts to make such decisions based on the experience that the process experts have from operating the plant for many years. Aging of the workforce is a major concern for industries in most of the regions since this workforce knowledge may not get effectively transferred to the next generation of engineers.

Most processes lack such real-time exchange due to fragmented systems and processes. Decisions are made based on the limitations of these disparate systems, making it difficult to drive speed and efficiency higher. The disparate systems are a major problem for most process industries, because the real-time exchange of information between production and the rest of the enterprise is critical for making sound business decisions that will improve responsiveness, increase productivity, reduce costs and assure regulatory compliance.

Adoption of new technologies in process control such as distributed control system (DCS) systems and batch automation software has also been a deterrent for the process experts. The constant evolution of software and changes makes it demanding for plant engineers to constantly upskill or re-skill their system knowledge as against developing process knowledge and improving decision making on the process.

Process operators and experts on the plant floor at times need to make difficult decisions on a daily basis to improve the productivity of the plant. For instance, the operators and experts make decisions for reduction in operating costs, improving quality of products, increase reliability and profitability, etc. An example of reduction in operating costs could include making decisions to avoid waste or improve the efficiency of the operating plant or facility. For improvement in quality of the product, the experts can make decisions to ensure that the batches execute consistently close to a "golden" batch profile. A "golden" batch profile can consist of an ideal profile for a product without any defects or manufacturing issues. The operator can make decisions to increase reliability and profitability, for example, by identifying potential problems to enable preventive and proactive maintenance, increasing asset uptime and availability, etc.

Cost of over quality and cost of reprocessing (off specification production) below quality products directly impacts the operating margin of the plant. Operations may not always have access to prior information or decisions with respect to recipe proportions, dynamic plant operating conditions, equipment efficiencies, etc., to churn out the right quality of product. Any indecision in this regard could hamper the overall product quality, which reduces the operational efficiency of the plant.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system. The sensors 102a and actuators 102b are collectively referred to throughout the Specification as "physical twins." A physical twin is a physical asset of which a digital replica is referred to as a "digital twin."

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for interactive batch operations enabling operation excellence and competency transition. For example, this functionality could be implemented in an operator console 110, a server 116, or a computing cloud 118 or remote server.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where interactive batch operations enabling operation excellence and competency transition can be used. This functionality can be used in any other suitable system.

Figure 2:
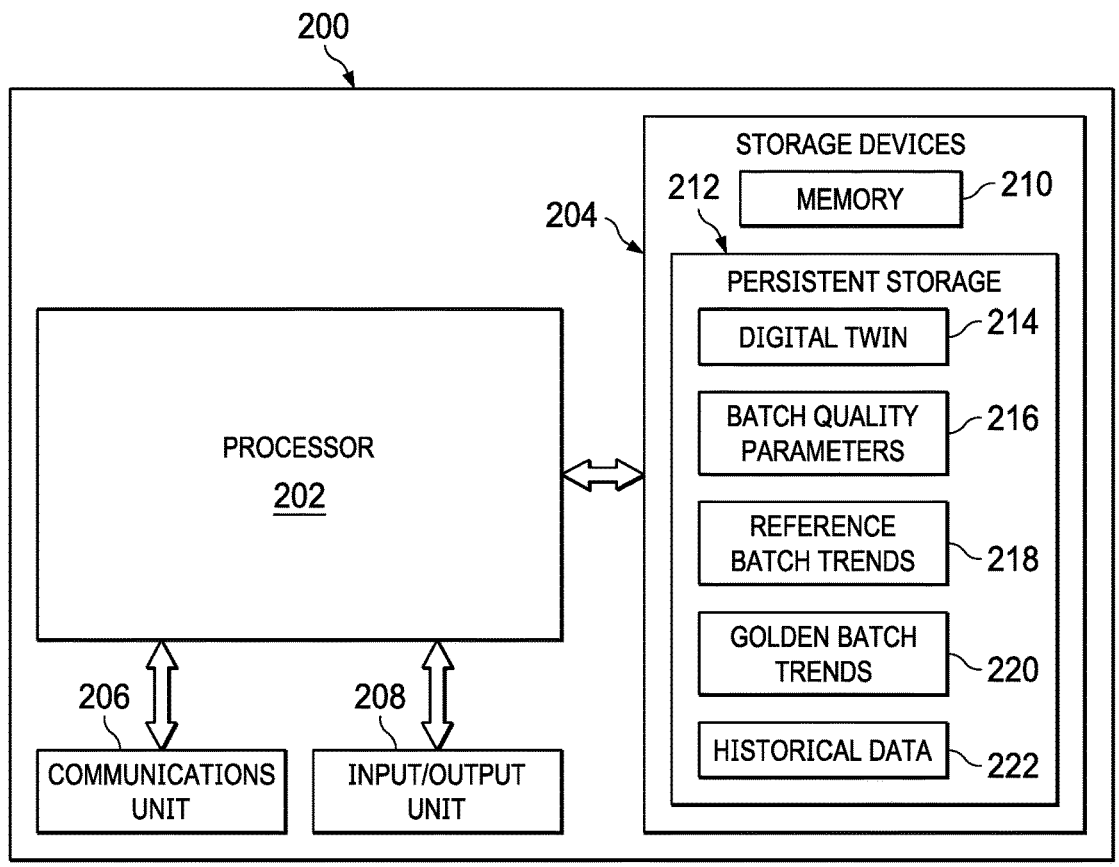
FIG. 2 illustrates an example device for interactive batch operations enabling operation excellence and competency transition according to this disclosure.

FIG. 2 illustrates an example device 200 for interactive batch operations enabling operation excellence and competency transition according to this disclosure. The device 200 could, for example, denote an operator console 110, server 116, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could support interactive batch operations enabling operation excellence and competency transition. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc. The persistent storage 214 could include the digital twins 214.

A digital twin 214 is a digital replica of a physical component of the system. Each component of the system corresponds to a unique and individual digital twin 214. Different versions of the individual twin 214 can represent the current state of the physical twin, an potential version of the physical twin, or any other version or representation of the physical twin at any point in the life cycle of the physical component.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for interactive batch operations enabling operation excellence and competency transition, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
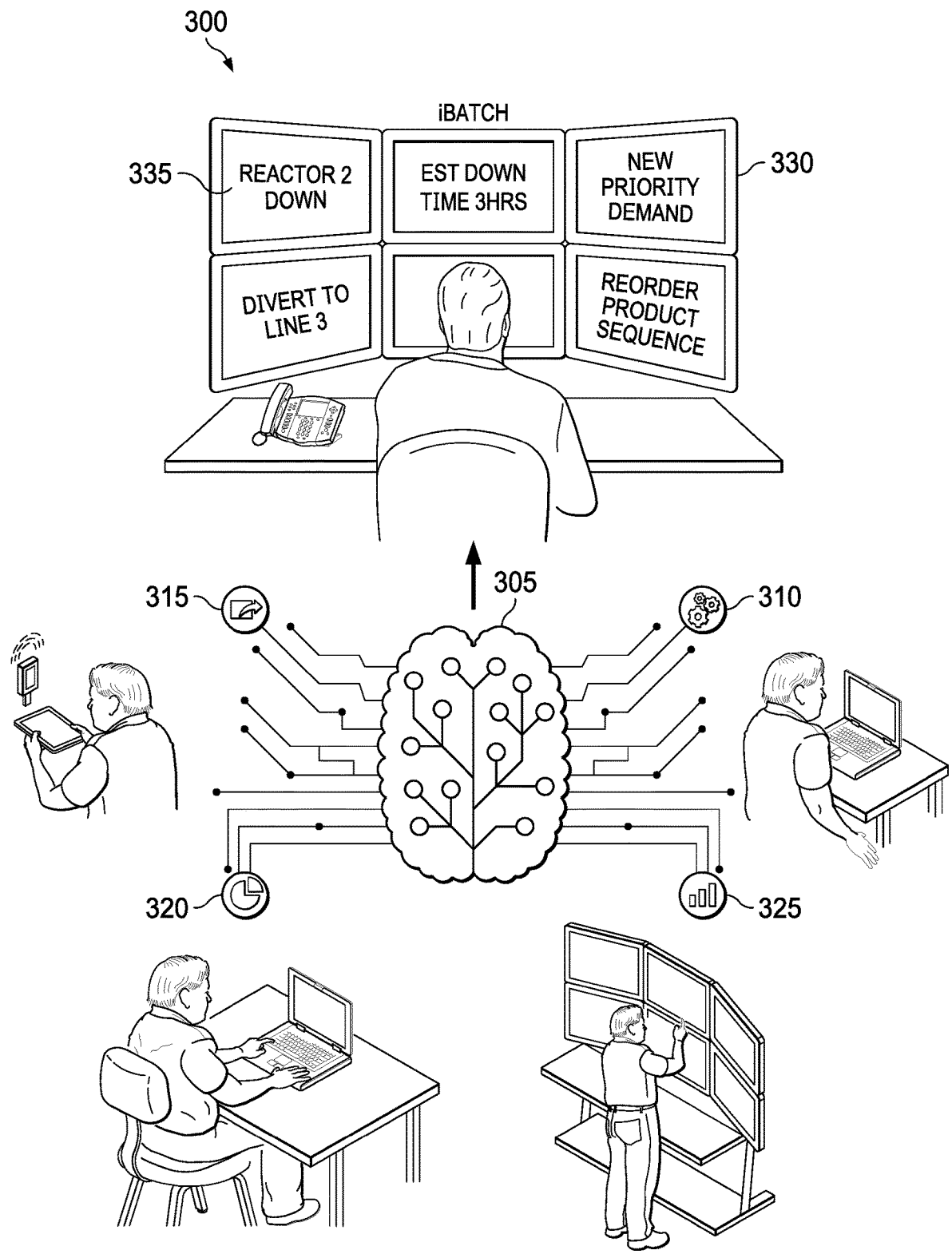
FIG. 3 illustrates an exemplary interactive batch (iBATCH) operating system according to this disclosure.

FIG. 3 illustrates an exemplary interactive batch (iBATCH) operating system 300 according to the embodiments of this disclosure. The embodiment of the interactive batch (iBATCH) operating system 300 illustrated in FIG. 3 is for illustration only. FIG. 3 does not limit the scope of this disclosure to any particular implementation of an interactive batch (iBATCH) operating system.

A batch process plant or batch operating system 300 can include several sections such as a planning & scheduling section 310, a maintenance section 315, a quality department section 320, a process control room section 325, etc. The systems in each of these sections/departments may come from different vendors.

The planning & scheduling section 310 can deal with procurement of raw materials and maintain the schedule of all delivery of said raw materials. The planning & scheduling section 310 can determine shortages of materials or regularly scheduled deliveries and refills of materials used in a batch process. The planning & scheduling section 310 can maintain the demand for the various products, which is passed on to the production section. For instance, the planning & scheduling section 310 can track orders or predict orders from a customer to monitor the demand for a specific product or a group of products. The planning & scheduling section 310 can maintain the delivery schedule of the tanker/wagons/marine as well as information related to the quantities, blending of different products, etc. The planning & scheduling section 310 can track the products or transportation services from the batch process manufacturing plant or refinery.

The maintenance section 315 can manage the maintenance schedule of an entire plant. The maintenance schedule can include field instrumentation, equipment such as reactors, mixers, blenders, etc. The maintenance schedule can also attend to breakdown situations or ordinary maintenance and replacements of the field instruments or equipment.

The quality section 320 maintains the historical data for all quality checks for products manufacturing. The quality section 320 stores data on any defects in the batch process or the produced goods.

The production section 325 can manage the operations for creating products from the raw materials. The production section 325 executes the batch sequences over a predefined set of equipment and defined set of quantities to create a final product. Day to day operations can include identifying the products that need to be created based on the daily demand as supplied by a marketing department, and equipment selection for running the batch sequences, etc.

The iBATCH 305 can interface with each of these systems to gather data that it would use as part of its analytical engine to help determine the best alternative actions in cases of any process deviations, process disruptions, equipment breakdowns, batch schedule changes, etc. These alternative actions can be presented to the user through an assisted-decision-making user interface. Through process simulations using software for process design and simulation, such as a UNISIM design or a digital twin 214 for process visualization, the resultant impact of each of the alternative actions on the running process enable the user to make a well-informed decision.

In addition to the above, the iBATCH 305 can also be equipped to receive a user query through the user interface (voice-based, keyboard, etc.) on certain process conditions for which the user needs guidance.

The iBATCH 305 is a system that interfaces with various information systems as stated above, analyses the information, and builds a knowledge repository, which can be used for achieving operation excellence in batch operations. The iBATCH 305 includes a self-learning algorithm that records the various batch operations and data from dependent systems over time. The data from this algorithm is stored as a knowledge repository in a relational database. The iBATCH 305 can derive insights through what-if analysis or correlation and regression analysis (analytical engine) based on planning and scheduling events, quality data, unit failures or availability, current state of batch operations, etc. The iBATCH 305 can provide engagement with users, such as through system interactions via smart visualizations. The iBATCH 305 can bring together different sections of a plant such as operations, maintenance, planning, and procurement to be provided through a user interface 330. The iBATCH 305 can provide integration with software for process design and simulation, such as a UNISIM design or digital twin 214, or any existing plant modelling software to enable the users to visualize the outcome of the best alternative decisions from the analytical engine.

The iBATCH 305 can aid a customer or user by enabling smart and fast decision making, improving situational awareness, reducing off specification production, reducing equipment break downs, increasing competency management, reducing the cost of ownership, etc.

For enabling smart and fast-decision making, iBATCH 305 is a single platform that can enhance decision making for the users based on relevant data. The relevant data can include batch operation data, batch process dynamics data based on key performance indicators (KPIs), production planning data based on market demand, planning and scheduling data, equipment breakdown or equipment maintenance data, product quality data, inventory data for the raw materials, ambient conditions data, etc.

For reducing off-specification production, the iBATCH 305 can monitor a golden batch, a cost of over quality, batch re-processing, etc. To monitor the golden batch, the iBATCH 305 can track the current batch with the golden batch parameters and advise the user on key decisions it can take to make the current batch meet the golden batch trends. The golden batch parameters are parameters or indicators that suggest the product or process is performing optimally, where the optimal performance could be an acceptable threshold for a product or process. In certain embodiments, the iBATCH system monitors the golden batch parameters and can determine if a parameter can be adjust automatically to improve the product or process. iBATCH 305 can determine a root cause of a deviation of a batch trend against the golden batch trends and assist batch operators in making the right decision to recover the batch. Live tracking of critical batch parameters are used against a reference trend, such as a golden batch trend. Detection and alert deviation in batch performance can be detected early on and assist operators based on process knowledge, equipment knowledge, and historical knowledge on how to recover the batch. When the iBATCH 305 can adjust operating controls to improve the parameter without requiring user assistance, the iBATCH 305 can make the adjustments to components or controls of the manufacturing system.

To reduce the cost of over quality, iBATCH 305 can indicate to the user that the specifications for a current batch is above the current quality standard in order to avoid the cost of over quality. The quality standards for over quality of goods can be defined based on contractual agreements or other industry standards.

For reducing batch re-processing, iBATCH 305 can provide actionable instructions to the user on how to recover a batch that has not met the quality standards. The iBATCH 305 can also proceed with the instructions when it is determined that a user's interaction is not necessary. In other words, when the iBATCH 305 system determines a solution for reducing batch re-processing that does not require a user to perform a function outside the control of the system, iBATCH 305 can take any necessary steps to automatically reduce the re-processing. The quality standard for batch re-processing can also be determined based on contractual agreements or industry standards.

The iBATCH 305 can detect or determine equipment breakdowns. iBATCH 305 can identify possible ways to recover the batch in the event of an equipment breakdown taking into consideration past equipment failure data, equipment recovery time, maintenance planning information, etc. The equipment breakdowns can include communication loss between components, failure to receive acknowledgements, detection of equipment or processes malfunctioning, etc. The iBATCH 305 can assist re-routing of affected batches taking into consideration the batch scheduling, the acquisition of equipment, etc. The iBATCH 305 can re-prioritize scheduled batches based on equipment break downs. The iBATCH 305 can feed inputs back to the ERP system to enable smart re-scheduling of batches.

The iBATCH 305 can increase competency management. For example, the system can enable faster and more accurate decision making for operations using data science. Data science allows the iBATCH 305 to discovers knowledge of the system though analyzing the historical data. The historical data can provide insights into the system from improving different processes.

The iBATCH 305 provides an ecosystem to optimize production with minimum competency needs enabling workforce transition. In other words, the system can either operate independently of the user and indicate changes to the system for review or provide a user interface for enhancing the production or processing without requiring years of experience. iBATCH 305 improves the situational awareness of the batch process for a work force. For example, the system can analyze a fault and provide the user with acceptable options for fixing the fault.

The total cost of ownership for a manufacturing facility and production of goods is reduced using the iBATCH system 305. Through a single integrated platform for processes through a single window or a plurality of connected displays, the iBATCH can enhance operational excellence.

Figure 4:
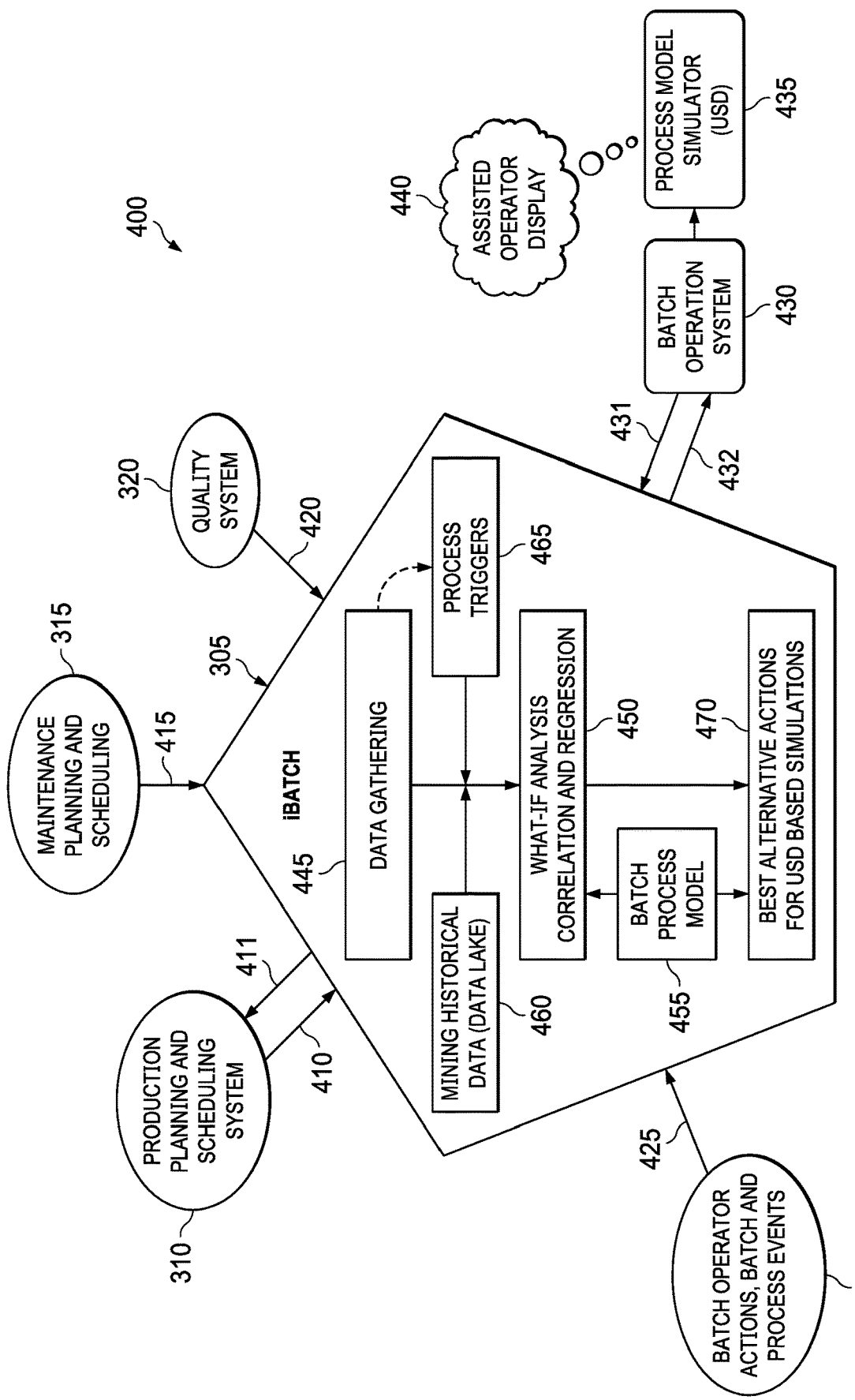
FIG. 4 illustrates an exemplary workflow of an iBATCH system according to this disclosure.

FIG. 4 illustrates an exemplary workflow 400 of an iBATCH system 300 according to embodiments of this disclosure. The embodiment of the workflow 400 illustrated in FIG. 4 is for illustration only. FIG. 4 does not limit the scope of this disclosure to any particular implementation of a workflow for an iBATCH system.

The workflow 400 includes the iBATCH 305, the planning & scheduling section 310, the maintenance section 315, the quality department section 320, the process control room section 325, a batch operating system 430, a process model simulator 435, an assisted operator display 440, etc. Each of the sections and also the batch operating system 430 includes a respective input feed for inputting information to the iBATCH 305. The planning & scheduling section 310 and the batch operating system 430 also include respective outputs that receive information from the iBATCH 305. To clarify, the inputs and outputs are respective to the iBATCH 305, but refer to the individual sections that are related to the respective inputs and outputs.

The planning and scheduling section 310 includes a planning and scheduling (S&P) input feed 410 and a planning and scheduling output feed 411. The S&P input feed 410 can provide production planning and scheduling data from ERP systems. The S&P output can provide feedback actions from iBATCH 305 to ERP for smart re-scheduling of batches.

The maintenance section 315 includes a maintenance input 415. The maintenance input 415 can provide planning data and historical equipment availability or failure data.

The quality section 320 includes a quality input 420. The quality input 420 can provide product quality data of current batch and provide product quality data of past golden batches.

The process control room section 325 includes a process input 425. The process input 425 provides record of operator actions performed on a current batch and past historical data.

The batch operating system 430 includes batch input 431 and batch output 432. The batch input 431 provides current details about the batch and the process that is performed. The batch output 432 provides a best alternative action to the user through assisted user visualizations on the assisted operator display 440.

The iBATCH 305 includes data gathering 445, what-if analysis or correlation and regression analysis (analysis 450), batch process model 455, mining data 460, process triggers 465, and best alternative actions 470.

For data gathering 445, the iBATCH 305 engine constantly gathers real-time data from various sources, including process and operational data from the batch operations system 430, which could be a DCS or a programmable logic controller (PLC); alarms and notifications from the batch operations system 430; historical data of key performance indicators of the batch process from a historian; planning and scheduling data; maintenance and planning data (includes historical data on equipment failures and calibration data); quality analysis data for the current batch and historical batches. Each system or section uses a different format to structure the engineering configuration. Additionally, iBATCH 305 can use a flat file or database system or propriety method to store the information.

A data collection framework for the data gathering 445 uses a common generic format and common information system to structure and store data collected from different industrial control and instrumentation systems. This enables building of a common application infrastructure that can be used across different industrial control and instrumentation systems.

A data agent can be deployed on each of the sections that store the knowledge of the source system from which data needs to be collected. Primarily the data agent knows the location and storage mechanism of data to be collected from the source system. The data agent is responsible for collecting data from the source system. Data agents are remotely executed on the source system. This can be developed in a technology that is compatible with the technology platform of the source system.

For the what-if analysis or correlation & regression analysis 450, the heart of the iBATCH 305 is a processor that performs analysis 450. The what-if analysis or correlation and regression analysis is performed on the data that is gathered from the various sources in association with the process trigger 465. Based on the analysis 450, the iBATCH 305 can determine possible alternative actions that the user could choose to do to ensure the continued operation of the batch and help meet the quality and the schedule requirements for the product.

In the analysis 450, the first step is collection of the data. The iBATCH 305 develops seamless data integration between different departments or sections within a batch processing facility and a common data repository.

The next step of analysis 450 is contextualization. The iBATCH 305 provides the intelligence to understand the differences in the level of abstraction and time granularity required by various applications and transforms the data as necessary. The intelligence can co-relate events or patterns of first, second or third order parameters or equipment to precisely identify the root cause of a deviation or a process disruption.

The final step of analysis 450 involves exploiting the common intelligent data repository to enable business processes, such as plan versus actual tracking, supply chain forecasting, retrospective analysis, what-if scenarios and further reporting and advanced analytics.

For instance, if there is a sudden breakdown of a heating jacket around a process reactor, the iBATCH 305 gathers the data from the various sections and correlates the data with the batch process model 455 and a current state of the batch. Based on the gathered and correlated data, the iBATCH 305 can provide to the user two to three alternative decision choices that the user could make to recover the batch and help save on product costs.

As examples when a sudden breakdown of a heating jacket around a process reactor occurs, different design choices could include re-routing a current product from a first reactor to a second reactor by operating a sequence of valves; re-scheduling the batch that was planned on the line of the second reactor to a later point taking into account the planning and scheduling data; and based on the batch quality parameters and historical data to resolve similar the heating jacket problems, make a decision to wait for a threshold time, for example approximately 30 minutes, without having to impact the quality of the batch. The impacts of each of these alternatives can be provided as a process visualization to the user to take an informed decision.

The iBATCH 305 can mine historical data 460. As the data is gathered from the various sources, the date can be stored (post analysis as a knowledge repository) in a relational database of the iBATCH system 305. This historical data can be an important source of information to the analytical engine as it tries to correlate the current state of the plant with the historical data as it computes the output.

The iBATCH 305 can include process triggers 465. The process triggers include process conditions, which are events that require operators to take actions on a running batch plant. Example of process triggers 465 can include an equipment failure, deviation from golden batch trends, non-availability of a certain raw material, etc. Specific examples can include a sudden decrease in catalyst during a reaction process, change in batch schedule priorities, etc. These process triggers 465 can be user-defined or can be identified through machine learning based on past data.

The iBATCH 305 can determine and include the best alternative actions 470. The best alternative actions 470 are essentially the output 432 of the iBATCH System 305 that enables the smart and fast decision making in the production system. With reference to the batch process model 455, the iBATCH 305 integrated with software for process design and simulation, such as a UNISIM design or any other process modelling software, can present to the user a potential resultant impact of each of the alternative decision choice presented to the user based on the current process condition in the plant.

The analytical engine can determine the best alternative actions 470 based on the current process condition of the plant in reference to the batch process model fed through software for process design and simulation, such as a UNISIM design, or any process modelling software. Once the best alternative actions 470 are determined, iBATCH 305 can create a plugin to the software for process design and simulation, such as a UNISIM design or a digital twin 214 for process visualization, that allows the user to visualize the impact of each of the decision choices on the process model. This will enable the user to take an informed decision whose outcome is more or less than certain about.

The iBATCH 305 can reduce the dependency on process experts or experienced operators in the plant to achieve operational excellence. The iBATCH 305 can act as a "software robot" to the new plant operators and assist them in taking process decisions without affecting overall plant productivity.

Figure 5:
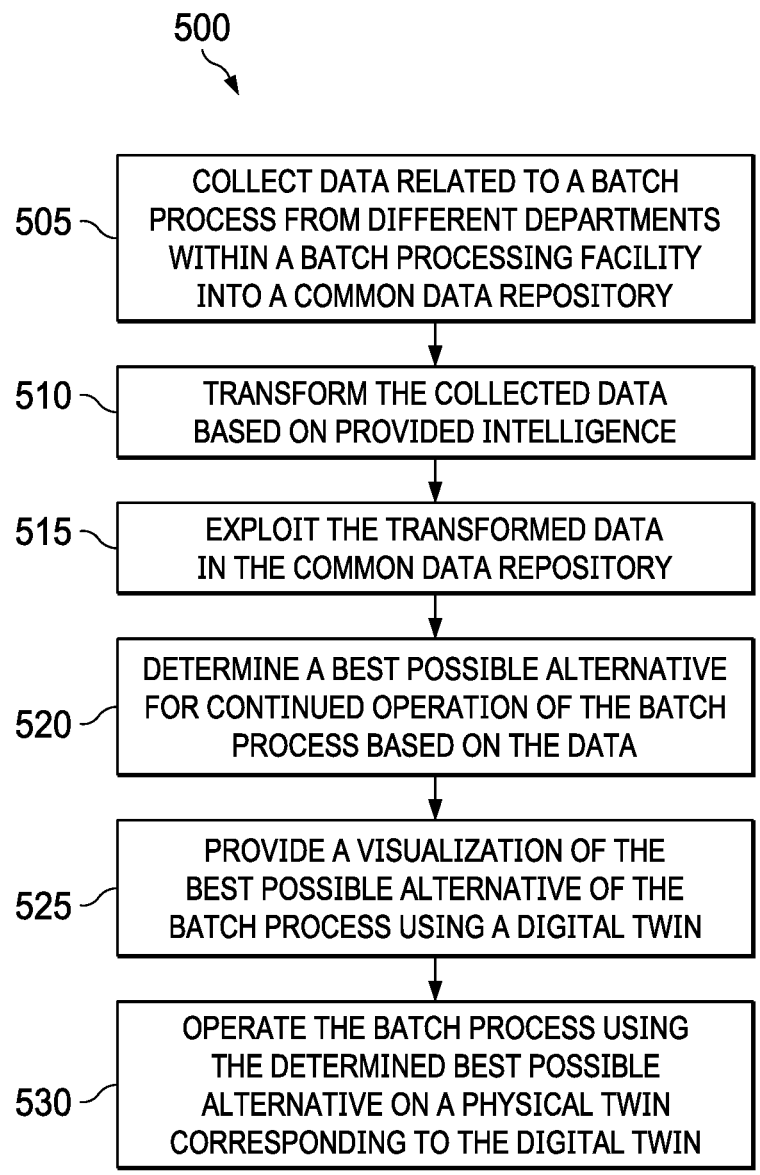
FIG. 5 illustrates a process for interactive batch operations enabling operation excellence and competency transition according to this disclosure.

FIG. 5 illustrates a process 500 for interactive batch operations enabling operation excellence and competency transition according to embodiments of the present disclosure. For example, the process depicted in FIG. 5 may be performed by the device 200 in FIG. 2. The process may also be implemented by the iBATCH system 300 in FIG. 3.

In operation 505, the device 200 collects data related to a batch process from different sections within a batch processing facility into a common data repository. The different sections can include a planning & scheduling section 310, a maintenance section 315, a quality department section 320, and a process control room section 325.

The device 200 develops a seamless data integration between the different departments and the common data repository using a common format and structure for the data. The data can be originally stored in each section using different formats and structures. When the data is received from each of the section, the iBATCH system converts received data into the common format and structure locally. In certain embodiments, the iBATCH system can integrate the common format and structures into each of the sections or into compatible sections. The iBATCH system can communicate with the different sections to determine the capability to change the format and structure for each section.

The device 200 integrates the data based on the common format and the structure for the data developed by the seamless data integration. Once the data from each section is received and converted, the iBATCH system integrates the data into a database.

In operation 510, the device 200 transforms the collected data based on provided intelligence. The provided intelligence provides differences in levels of abstraction and time granularity required by various programs.

In operation 515, the device 200 exploits the transformed data in the common data repository. Exploiting the data includes planned versus actual tracking, supply chain forecasting, retrospective analysis, what-if scenarios, and further reporting and advance analytics.

In operation 520, the device 200 determines a best possible alternative for continued operation of the batch process based on the exploited data. Examples of the best possible alternative can include re-routing a current product, re-scheduling a batch, and monitoring the batch without altering the batch process in case an issue is naturally resolved. Monitoring the batch comprises comparing the exploited data to batch quality parameters, reference or golden batch trends, and historical data.

In operation 525, the device 200 provides a visualization of the best possible alternative of the batch process using a digital twin. The visualization can include a digital twin for every component in the processing system. The visualization can present the current state of the processing system, as well as the results of any modification to a digital twin or multiple digital twins. The visualization can also provide a state of the digital twins for any point in the lifecycle of the physical twin.

In operation 530, the device 200 operates the batch process using the determined best possible alternative on a physical twin corresponding to the digital twin. The iBATCH system can send data or commands to the different section of the manufacturing system in order to correct and defects or irregularities. The iBATCH system also can operate the batch process to obtain a product level that meets the golden batch trends.

The device 200 displays other possible alternatives to a user interface. After determining the best possible alternative, the system maintains the other possible alternatives to display by the user.

The device 200 receives a selection of one of the other possible alternatives. A selection of one of the other possible alternatives overrides the best alternative determined by the iBATCH system.

The device 200 operates the batch process using the selected one of the other possible alternatives. The user can also select multiple alternatives to act as a combination of alternatives. The user can have the option to continue with the best possible alternative along with the selected alternative or override the best possible alternative. In certain embodiments, the default is set to override the best possible alternative.

Although FIG. 5 illustrates an example process 500 for interactive batch operations enabling operation excellence and competency transition, various changes could be made to FIG. 5. For example, while shown as a series of steps, various steps in each figured could overlap, occur in parallel, occur in a different order, or occur multiple times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
collecting data related to a physical batch process running on physical equipment within a batch processing facility, the data collected from different departments within the batch processing facility into a common data repository;
building a knowledge repository over time from the collected data, the knowledge repository being built at least in part using a self-learning algorithm that identifies differences in levels of abstraction and time granularity required by various programs within the batch processing facility;
transforming the collected data in the common data repository using the knowledge repository;
exploiting the transformed data in the common data repository;
determining a best possible alternative for continued operation of the physical batch process using a digital twin that uses the exploited data to simulate the physical batch process in order to visualize a number of possible alternatives for continued operation of the physical batch process;
providing a visualization of the best possible alternative of the physical batch process using the digital twin; and
operating the physical batch process using the determined best possible alternative on the physical equipment within the batch processing facility.

2. The method of claim 1, further comprising:
developing a seamless data integration between the different departments and the common data repository using a common format and structure for the data; and
integrating the collected data based on the common format and structure for the data developed by the seamless data integration.

3. The method of claim 1, wherein exploiting the data includes plain versus actual tracking, supply chain forecasting, retrospective analysis, what-if scenarios, and further reporting and advanced analytics.

4. The method of claim 1, wherein the best possible alternative is one of:
re-routing a current product; and
monitoring the batch without altering the physical batch process in case an issue is naturally resolved.

5. The method of claim 4, wherein monitoring the physical batch comprises comparing the exploited data to batch quality parameters, reference batch trends, golden batch trends, and historical data.

6. The method of claim 1, further comprising:
displaying other possible alternatives to a user interface;
receiving a selection of one of the other possible alternatives; and
operating the physical batch process using the selected one of the other possible alternatives.

7. An apparatus comprising:
a memory; and
a processor operably coupled to the memory, the processor configured to:
collect data related to a physical batch process running on physical equipment within a batch processing facility, the data collected from different departments within the batch processing facility into a common data repository;
build a knowledge repository over time from the collected data, the knowledge repository built at least in part using a self-learning algorithm;
transform the collected data in the common data repository using the knowledge repository;
exploit the transformed data in the common data repository;
determine a best possible alternative for continued operation of the physical batch process using a digital twin that uses the exploited data to simulate the physical batch process in order to visualize a number of possible alternatives for continued operation of the physical batch process, where the best possible alternative is either re-routing a current product or monitoring the batch without altering the physical batch process in case an issue is naturally resolved;
provide a visualization of the best possible alternative of the physical batch process using the digital twin; and
operate the physical batch process using the determined best possible alternative on the physical equipment within the batch processing facility.

8. The apparatus of claim 7, wherein the processor is further configured to:
develop a seamless data integration between the different departments and the common data repository using a common format and structure for the data; and
integrate the collected data based on the common format and structure for the data developed by the seamless data integration.

9. The apparatus of claim 7, wherein the self-learning algorithm identifies differences in levels of abstraction and time granularity required by various programs within the batch processing facility.

10. The apparatus of claim 9, wherein to exploit the data, the processor is configured to perform plain versus actual tracking, supply chain forecasting, retrospective analysis, what-if scenarios, and further reporting and advanced analytics.

11. The apparatus of claim 7, wherein the best possible alternative includes re-scheduling a batch.

12. The apparatus of claim 7, wherein to monitor the batch, the processor is configured to compare the exploited data to batch quality parameters, reference batch trends, golden batch trends, and historical data.

13. The apparatus of claim 7, wherein the processor is further configured to:
display other possible alternatives to a user interface;
receive a selection of one of the other possible alternatives; and
operate the physical batch process using the selected one of the other possible alternatives.

14. A non-transitory computer readable medium containing instructions that, when executed by at least one processing device, cause the at least one processing device to:
collect data related to a physical batch process running on physical equipment within a batch processing facility, the data collected from different departments within a batch processing facility into a common data repository;

build a knowledge repository over time from the collected data, the knowledge repository built at least in part using a self-learning algorithm;

transform the collected data in the common data repository using the knowledge repository;

exploit the transformed data in the common data repository;

determine a best possible alternative for continued operation of the physical batch process using a digital twin that uses the exploited data to simulate the physical batch process in order to visualize a number of possible alternatives for continued operation of the physical batch process;

provide a visualization of the best possible alternative of the physical batch process using the digital twin; and operate the physical batch process using the determined best possible alternative on the physical equipment within the batch processing facility.

15. The non-transitory computer readable medium of claim 14, wherein the instructions further cause the at least one processing device to:

develop a seamless data integration between the different departments and the common data repository using a common format and structure for the data; and integrate the collected data based on the common format and structure for the data developed by the seamless data integration.

16. The non-transitory computer readable medium of claim 14, wherein the self-learning algorithm identifies differences in levels of abstraction and time granularity required by various programs within the batch processing facility.

17. The non-transitory computer readable medium of claim 16, wherein the instructions to exploit the data comprise instructions to perform plain versus actual tracking, supply chain forecasting, retrospective analysis, what-if scenarios, and further reporting and advanced analytics.

18. The non-transitory computer readable medium of claim 14, wherein the best possible alternative is one of:
re-routing a current product;
re-scheduling a batch; and
monitoring the batch without altering the physical batch process in case an issue is naturally resolved.

19. The non-transitory computer readable medium of claim 18, wherein the instructions to monitor the batch comprise instructions to compare the exploited data to batch quality parameters, reference batch trends, golden batch trends, and historical data.

* * * * *